Sept. 20, 1966 W. J. TOULIS 3,274,537
FLEXURAL-EXTENSIONAL ELECTROMECHANICAL TRANSDUCER
Filed Oct. 17, 1963 4 Sheets-Sheet 1

INVENTOR.
WILLIAM J. TOULIS
BY
ATTORNEYS

Sept. 20, 1966  W. J. TOULIS  3,274,537
FLEXURAL-EXTENSIONAL ELECTROMECHANICAL TRANSDUCER
Filed Oct. 17, 1963  4 Sheets-Sheet 2

INVENTOR.
WILLIAM J. TOULIS
BY
ATTORNEYS

INVENTOR.
WILLIAM J. TOULIS

ATTORNEYS

Sept. 20, 1966          W. J. TOULIS          3,274,537
FLEXURAL-EXTENSIONAL ELECTROMECHANICAL TRANSDUCER
Filed Oct. 17, 1963                    4 Sheets-Sheet 4

INVENTOR.
WILLIAM J. TOULIS
BY

ATTORNEYS

United States Patent Office 3,274,537
Patented Sept. 20, 1966

3,274,537
FLEXURAL-EXTENSIONAL ELECTRO-
MECHANICAL TRANSDUCER
William J. Toulis, 1100 E. Broad St., Columbus, Ohio
Filed Oct. 17, 1963, Ser. No. 317,095
7 Claims. (Cl. 340—8)

The invention described herein may be manufactured and used by or for the Government of the United States of America for governmental purposes without the payment of any royalties thereon or therefor.

This application is a continuation-in-part of applicant's co-pending application entitled "Flexural-Extensional Electromechanical Transducer," Serial No. 317,097, filed October 17, 1963, Navy Case No. 22,765.

The present invention relates generally to an electromechanical transducer adapted to generate and radiate or detect sound in a fluid medium and which has a diaphragm which operates in the flexural mode of vibration and a driver (for vibrating said diaphragm) which operates in the extensional mode of vibration, and more particularly to such a "flexural-extensional" transducer with an improved hydrostatic pressure equalization feature for enabling said transducer to operate at widely-divergent ocean depths.

Among objects of importance of the present invention are:

To provide an improved preferably very-nearly-omni-directional sound propagating transducer.

To provide a transducer having low vibrational mass for high power outputs over a broad range of freqeuncies.

To provide a transducer having high electromechanical conversion efficiency over a broad band of frequencies.

To provide a transducer employing a piezoelectric ceramic driver where the power output is not limited by the tensile strength of the ceramic material of which the driver is composed.

To provide for use with an electroacoustic transducer, employing a piezo-ceramic driver, an effective liquid fill that minimizes the electrical arcing on the piezoceramic surface of the driver which is encountered under high power conditions.

To provide a composite transducer comprising a given number of individual diaphragm-driver sections whose cooperative action gives the transducer an improved frequency response and power output.

To provide a sound-propagating transducer capable of operating at widely-divergent ocean depths without the need for external equipment to compensate for the varying hydrostatic pressures encountered by said transducer.

To provide, for use in a liquid medium, a sound-propagating transducer whose internal cavity is automatically pressure equalized with respect to a widely-divergent range of external liquid pressures so as to be able to radiate high power outputs for a widely-divergent range of depth positions of said transducer within said liquid medium.

To provide, for use in the internal cavities of sound-propagating transducers, an improved pressure-release means for enabling said transducers to be utilized uniformly over a widely-divergent range of ocean depths.

Other objects and many of the attendant advantages of this invention will be readily appreciated as the same becomes better understood by reference to the following detailed description when considered in conjunction with the accompanying drawing in which.

Figure 6:
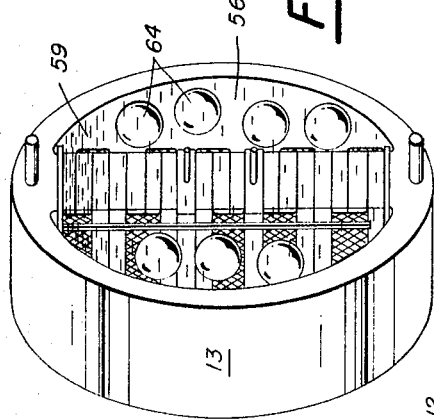
Figure 5:
FIG. 5 shows an individual "compliant tube" of the "liquid-plus-compliant-tube fill" for the transducer cavity.
Figure 7:
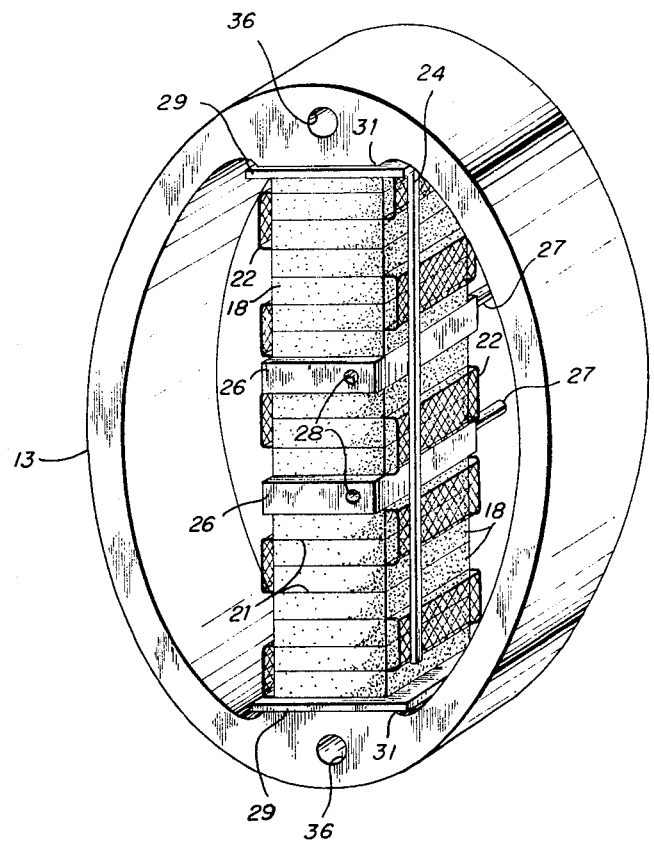

FIG. 6 portrays the use of a transducer "fill" consisting of a liquid and "spherical shells" present in said liquid, and FIG. 7 shows in perspective an exemplary transducer of this invention.

The principal portion of the transducer 11 is a series of substantially-identically constructed sections 12. FIG. 3(A–D) portrays a preferred embodiment of one of these sections 12. Each of these sections 12 consists essentially of a diaphragm 13, which is adapted to undergo flexural vibration to transmit sound into the fluid medium in which the transducer is immersed, and a driver 14. The driver 14, mounted in thrust-transmitting relationship with diaphragm 13, is adapted to operate in the longitudinal (extensional) mode of vibration to impart to its diaphragm 13 the desired flexural vibrational motions.

Figure 3B:
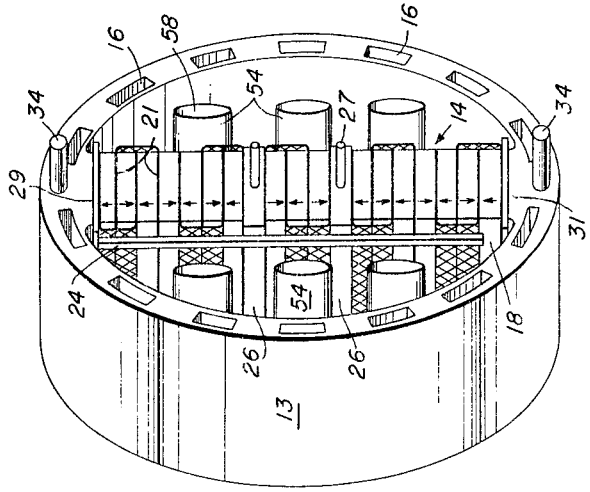
FIG. 3B shows a like diaphragm-driver section with a modified ("honeycombed") diaphragm.

The diaphragm 13 is essentially a section of "compliant tubing" a structure which is defined at length in the inventor's co-pending application Serial No. 39,410 filed June 18, 1960, and in the inventor's issued Patent No. 3,025,-504. Aluminum is a representative material for this diaphragm 13. In the preferred embodiment shown here an elliptically-shaped "compliant tube" of aluminum or like material, is employed for the diaphragm. The diaphragm may be solid in structure (FIG. 3A) or it may be "honeycombed" (i.e. made longitudinally perforate) as seen in FIG. 3B, the latter structure serving to produce a diaphragm of reduced density. The perforations 16 (shown in the FIG. 3B diaphragm embodiment) may extend throughout the longitudinal length of this diaphragm 13. The density of the diaphragm 13 may also be increased (rather than decreased) by the addition to the normal solid diaphragm (unperforated) of an "additional loading charge." A "mass loaded" diaphragm is shown in the FIG. 3B diaphragm embodiment where lead bars 17 are fixedly secured to the inner surface of the diaphragm at both sides thereof as shown. These lead bars 17 are preferably mounted in opposing center "balancing" positions at opposite sides of the diaphragm 13, with their respective longitudinally-running center lines lying along the plane of symmetry defined by the various minor axes of multiple cross sections of the diaphragm 13 and preferably these bars 17 run the full longitudinal length of the diaphragm 13. The variations of the diaphragm 13, as just described, are utilized as methods for varying the mechanical Q of the transducer 11 which is composed of these sections 12. The mechanical Q of a transducer increases with the density of its diaphragm, the thickness, mass loading, degree of curvature or stiffness of its diaphragm. This mechanical Q or sharpness of resonance of a vibrating structure is highly significant in terms of the electrical efficiency, acoustic power output and effective frequency bandwidth. A high mechanical Q leads to high efficiency and power output, but at a sacrifice in usable bandwidth. A low mechanical Q, on the other hand, improves usable bandwidth at the expense of efficiency and power output. Use of a "honeycomb" structure diaphragm (FIG. 3B) conveys the advantages of a low mechanical Q (improved frequency response). On the other hand, "mass loading" of the diaphragm (FIG. 3C) such as with lead bars 17 improves the efficiency and power output of the transducer, at the sacrifice of usable bandwidth.

The construction of the driver 14 for each of the sections 12 is the same regardless of whether a solid or "honeycombed," or "mass loaded" diaphragm is employed. The driver 14, as shown, is a "ceramic sandwich" driver structure which consists principally of a stack of piezoelectric ceramic plates 18. It is well known that certain materials undergo mechanical deformation when various voltages are applied across them. This effect, which can properly be described as the "converse" of the well-known "piezoelectric effect," has been found applicable to various polycrystalline ceramics whose most widely known member is probably barium titanate ($BaTiO_3$), which, when pre-polarized by the application of a sufficiently strong unidirectional field, serves as an excellent transducing element. An illustrative reference on such a barium titanate ceramic is U.S. Patent No. 2,486,560 to Grey. It has been found that, for the application herein, the lead zirconate titanate ceramic (which is disclosed in U.S. Patent No. 2,708,244 to Jaffe) is particularly appropriate.

The maximum power output from a transducer employing a ceramic driver may depend to a large extent on the degree of internal heat dissipation within the piezoceramic, the ability to dissipate heat rapidly and the duty cycle during normal operation. When the duty cycle is high and heat dissipation appreciable, the maximum power output (of the transducer) will be limited by the build-up in temperature within the ceramic driver. Because the thermal conductivity of ceramics is low, the piezoelectric ceramic comprising the driver 14 is constructed of thin piezo-ceramic plates 18 in the configuration of an elongate stack, as seen in the various figures of the drawing. Each of the ceramic plates 18 is plated with silver on two sides thereof and preferably on the sides to be bonded in order to serve as electrodes to polarize and also to drive the stack electrically. These ceramic plates 18 are supplemented by a series of heat-dissipating members 19 each of which consists of two horizontally-extending metallic (i.e., copper) inserts 21 and a vertically-extending fine-wire mesh member 22 which links the metallic inserts 21. With the metallic (preferably copper) inserts 21 sandwiched in-between adjacent ceramic plates 18, heat originating in the ceramic plates 18 on both sides of a metallic insert 21 will be conducted away to the fine-wire mesh member 22 from which this heat will then dissipate.

Heat dissipating members 19 also act as part of the electrical system which actuates the various ceramic plates 18 to cause the driver 14 to vibrate in longitudinal mode in response to the actuating electrical signal. It will be noted, as seen especially in FIGS. 3A-3D that each successive ceramic plate 18 is oppositely polarized from the next preceding ceramic plate. The drawing figures portray, with arrows, the inherent polarization of the various ceramic plates. With the individual heat-dissipating members 19 embracing, by their metallic inserts 21, a pair of successive, oppositely-polarized ceramic plates 18, by staggering the heat-dissipating members 19 which respectively appear to the left and to the right of the stack of ceramic plates (see FIG. 3A) these heat-dissipating members 19 also serve as electricity-conducting electrodes for actuating the ceramic plates 18. Each of the metallic inserts 21 is preferably co-extensive in area with the ceramic plate surfaces between which it is sandwiched so as to present a uniform and mechanically balanced electrode surface to each ceramic plate 18. With heat-dissipating members 19 positioned in a staggered series with respect to the stack of ceramic plates 18, there will be formed a vertical row of fine-wire mesh members 22 to the right of the ceramic-plate stack and a like vertical row of fine-wire mesh members 22 to the left of the ceramic-plate stack. A right-hand bus bar 23 is secured in an electrically-conductive connection to the right-hand vertical row of mesh members 22 and a left-hand bus bar 24 is connected in like fashion to the left-hand vertical row of these mesh members 22. With the bus bar 23 connected to the one polarity of the actuating electrical signal and the other bus bar 24 connected to the other polarity of the actuating electrical signal as appropriate for the given polarization of the various ceramic plates 18, the driver 14 (composed of these ceramic plates 18) will vibrate in the longitudinal mode of vibration to impart flexural vibratile movement to the diaphragm 13.

Located in the stack of ceramic plates 18 which are maintained in rectilinear stack conformation by appropriate conventional bonding are a pair of steel plates 26, each of which is substantially co-extensive with the ceramic plates of the stack. For the majority of sections 12 of transducer 11 each steel plate 26 is equipped at one end with a male prong 27 and at its opposite end with a female opening 28 which is adapted to accommodate a like prong fitted to the steel plate 26 of an adjacent ceramic-plate stack when proximate sections 12 are fitted together to form the assembled transducer (the joining together of the various sections 12 of the transducer 11 will be dwelled upon infra). These steel plates 26 act both as appropriate spacers in the ceramic-plate stack and as a means for securing together various proximally-located drivers 14 of the transducer.

The piezoceramic driver of this invention need not be of the "sandwich" construction portrayed herein. This piezoceramic driver 14 may be simply an integral, uniform piezo-driver with silver electrodes on appropriate outside surfaces thereof, but preferably it is of the composite "sandwich-like" construction defined herein, which is considerably more desirable (than the integral, uniform piezo-driver) for attaining maximum output and bandwidth with the transducer. Various other of the novel features of the transducer defined herein can be employed with drivers other than piezoelectric ceramic drivers, such as magnetostrictive drivers, for example.

Figure 3A:
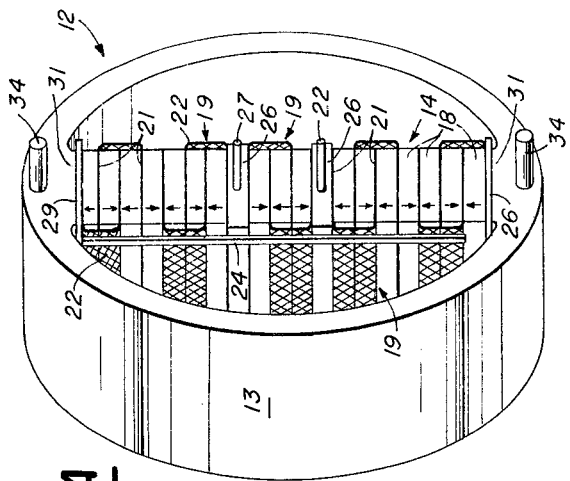
FIG. 3A shows one of the identical diaphragm-driver sections (of the transducer) utilizing a (slightly modified) "compliant tube" shape structure for the diaphragm (i.e., radiating surface)
Figure 3D:
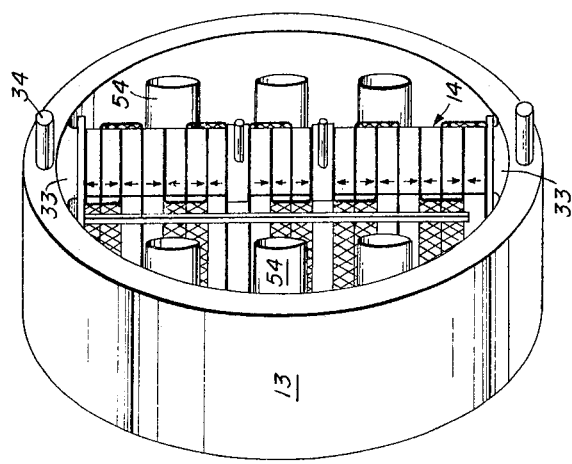
FIG. 3D shows a transducer section reflecting the use of a standard "compliant tube" shape diaphragm and "spacer," in contradistinction to the FIGS. 3A–3C which show diaphragms wherein the compliant tube shape structure has been slightly modified to enable it to be used as a diaphragm without the need for "spacers"
Figure 3C:
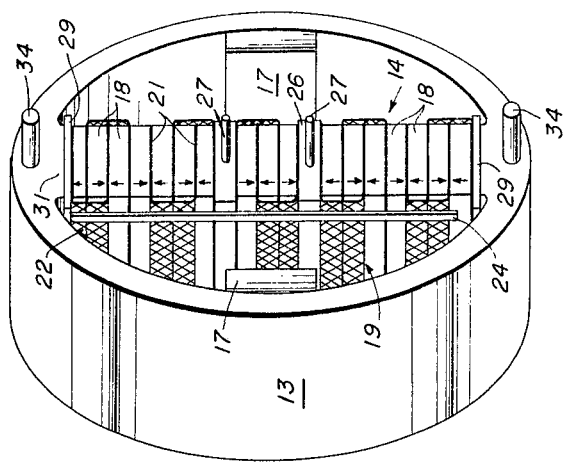
FIG. 3C shows a like diaphragm-driver section with another modification of the diaphragm (i.e., a "mass-loaded" diaphragm)

Located at the respective vertical extremities of the driver stack of ceramic plates are a pair of plastic sheet insulators 29 in compressed position between the vertical ends of the stack of ceramic plates 18 and the adjacent portion of the diaphragm 13 which is formed to accommodate the driver 14 in a tightly-holding fit. The conventional "compliant tube" shape structure which goes to form the diaphragm 13 may be modified as seen in FIGS. 3A-3C, to form the driver-abutting portion 31 which contacts plastic sheet insulator 29. On the other hand, if an "unmodified" elliptically-shaped "compliant tube" is employed it will be necessary to include, for mechanical reasons, intermediate plastic sheet insulator 29 and the compliant tube 32, a spacer 33 (see FIG. 3D). Insulators 29 which are to provide electrical insulation between the driver 14 and the diaphragm 13 and the spacers 33 (when employed) are preferably formed of as stiff a material as possible in order to minimize decoupling between the driver 14 and the diaphragm 13.

One of the limiting factors present when piezoceramic drivers are employed is the propensity for such drivers to fracture when employed for high acoustic power output. The yield strength of piezoceramics while in tension has been found to be only in the order of 1,000–4,000 lbs./in.² The stresses induced by electrical forces in the ceramic are comparable and definitely much higher if the maximum acoustic output is to be limited by internal heating. Inasmuch as the compressive strength, however, of piezoceramics is known to greater than 20,000 lbs./in.² the use of compressive "prestress" on a piezoceramic driver logically suggested itself as a way to eliminate fracture in the piezoceramic at high power output. The use of "biasing" stress to prestress the ceramic plates 18 is employed in the transducer 11 so that high acoustic power may be radiated by the transducer without danger of fracture of the ceramic. This prestress is mechanically achieved herein simply by forcing inwardly the two vertically extending walls of diaphragm 13 and sliding the ceramic-plate 18 stack, as supplemented by the end insulators 29, into place, as shown, after the proper dimensions and forces are selected to yield the desired degree of (compressional) prestress. When the vertically-extending walls of diaphragm 13 are forced inwardly to enlarge the "natural" vertical inside-dimension of this diaphragm 13 so that it will be able to accommodate a ceramic driver which is "longitudinally-oversized" with respect to the "natural" vertical inside dimension (of the diaphragm) and the positive "deforming" force removed from the diaphragm 13 after the ceramic driver has been inserted into operative position therewithin, the tendency of the diaphragm 13 to seek its natural ("underformed") shape is the source of the compressive "bias" for the ceramic-plate stack. The resulting prestress not only serves to prevent fracture of the ceramic material of the driver 14. The use of mechanical prestress to improve the yield strength of piezoceramic drivers has been employed previously, as seen, for example, in the U.S. Patent No. 2,930,912, entitled "Composite Electromechanical Transducer," and issued to H. B. Miller. In the Miller patent which, like the present invention, employs a stack of ceramic plates in its driver, a plurality of individual stiff rods are used to put and keep under compressive bias the stacked piezoceramic plates of the driver. The mode of effecting this compressive bias (prestressing) herein represents an improvement over that employing a plurality of stiff rods. In the "multiple rod" method there is the significant problem of getting equal stress on the ceramic driver 14. A lack of equal stress makes the ceramic liable to buckling and/or chipping. Here the compressive bias placed upon the ceramic driver 14 by diaphragm 13 ensures the application of equal stress thereto. Multiple "stiff-rod" biasing of the ceramic driver also produces an incapitating or degrading factor on the effective electromechanical coupling factor for the transducer because of the "stiffness" of the rods, that is, it produces a clamping action on the ceramic driver to limit its vibratory motion. Here, on the other hand, the biasing action does not limit the vibratile motion of the ceramic driver because the biasing structure (i.e. diaphragm) is mechanically resonant at the frequency of operation of the transducer. The dimensions of the diaphragm 13 herein are such that this diaphragm 13 is equally mass and stiffness controlled at optimum operating frequency, which is generally the resonant frequency. ("Stiffness" as used here is equatable with elastic resistance to change of dimension and "mass," as employed here, with inertive resistance to change of motion.) Another distinction between the presetting bias action here and the "multiple rod" bias action (such as in the Miller patent) is that in the multiple rod biasing the rods vibrate in the extensional or longitudinal mode of vibration whereas here the compressing (bias) member (diaphragm 13) vibrates in the flexural mode of vibration. This flexural mode of vibration is much more amenable to resonance operation, i.e., driver-compressing diaphragm 13 can be made to resonate with a feasible dimension requirement for the diaphragm. Compressing "rods," on the other hand, in order to be able to "resonate," would ordinarily be beyond practicable limits in length. The ability of the compressing member to attain resonance enables the transducer to achieve greater power output and efficiency.

Figure 1:
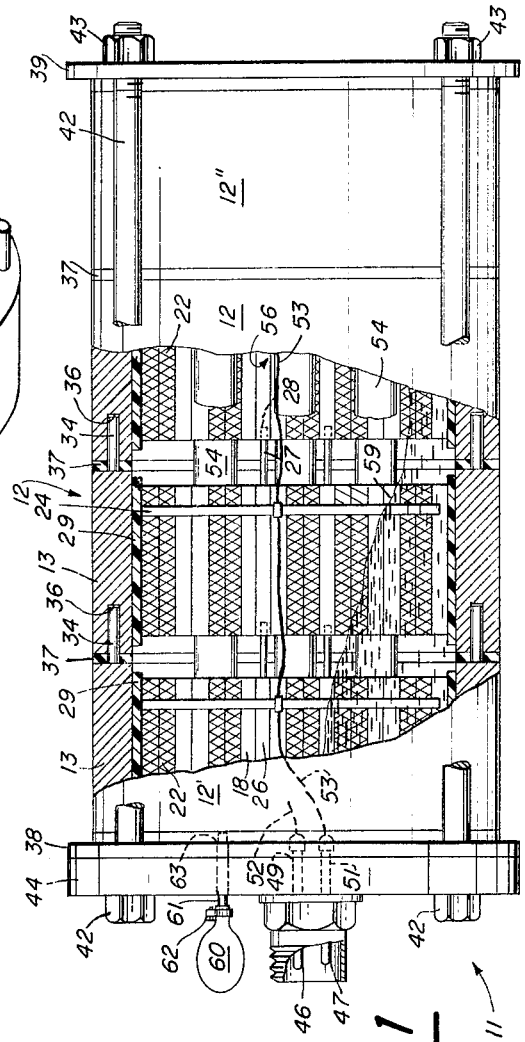
FIG. 1 is the transducer assembly, shown partly in section.
Figure 2:
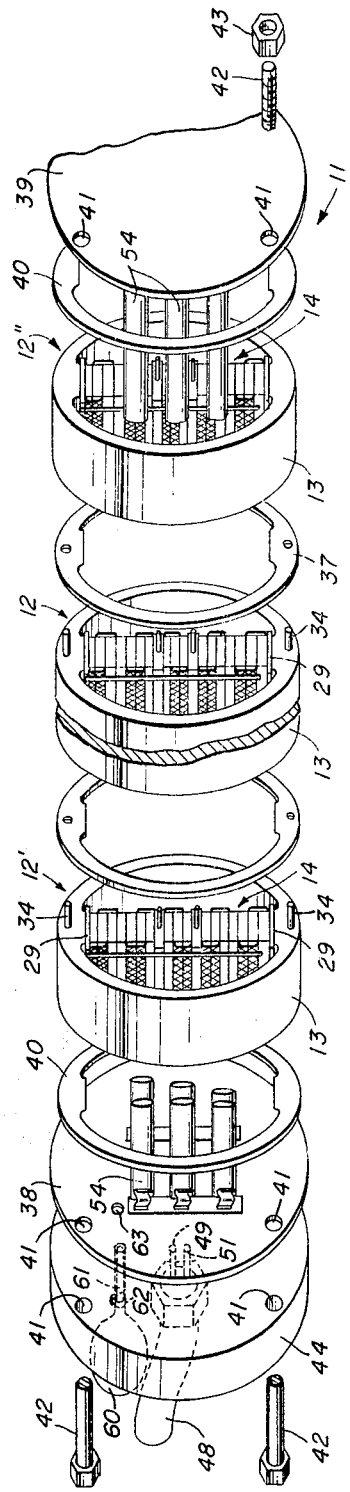
FIG. 2 is an exploded view of the transducer seen in FIG. 1 to show with greater clarity the majority of the various components which go into the assembled transducer.

Looking now to the transducer 11 as an assembled unit whose main operative portions are the various sections 12, FIG. 1 shows the assembled transducer partly in sectional view and FIG. 2 shows in exploded view the various main portions which go to make up the assembled transducer. Proximate transducer sections 12 are mechanically joined together by the union of complementary male and female connection members. The male prongs 27 extending from the steel plates 26 of one of the transducer sections 11 are complementarily insertable into mating openings 28 formed in the opposite side of steel plates 26 of the next adjacent transducer section 12, to hold adjoining sections 12 linked together. In like fashion the diaphragms 13 of adjacent sections 12 are provided with complementary prongs 34 and openings 36 which mate together. Intermediate proximate sections 12 of the transducer 11 there is a rubber gasket 37 which serves to develop, in conjunction with the compressive pressure (effected in a manner to be described infra) upon it by each of the proximate sections 12, a liquid-proof seal between these proximate sections 12.

The first and last sections 12 of the series of sections 12 which make up the complete transducer diaphragm are variously designated herein as 12' and 12'' respectively. The first section 12' may not have operative need for the openings 28 in its steel plates 26 and the last section 12'' may not have prongs 27 (on its steel plates 26) or prongs 34 (on its diaphragm 13). The respective ends of the assembled series of sections 12 are closed off by the respective closure plates 38 and 39, each of which has a rubber gasket 40 inserted between it and the abutting section 12. These closure plates 38 and 39 are appropriately bored to form holes 41 which receive a series of tie-rods 42 which, in conjunction with nuts 43 fasten to their threaded ends, serve both to hold the transducer sections 12 and their intervening gaskets 37 in a tight union and to maintain closure plates 38 and 39 in tight, closing position to seal off the ends of the transducer as well as serving to prevent the closure plates 38 and 39 from shifting laterally with respect to the series of joined transducer sections 12.

One of the closure plates (here shown as closure plate 38) is provided with a liquid-tight electrical coupling member 44 which has two externally located prongs 46 and 47 adapted to link to an external lead 48. The complementary internally-located contact members 49 and 51 of this electrical coupling member 44 are electrically connected to two respective leads 52 and 53. The first of these leads, lead 52, passes from the electrical coupling member 44 to interconnect, in series fashion, each right hand bus bar 23 of the various transducer sections 12 to the one polarity actuated portion of electrical coupling member 44 and the other of these leads, lead 53, acts to electrically link the left-hand bus bars 24 of the respective transducer sections 12 to the other polarity-actuated portion of the electrical coupling member 44. It is in this fashion that the electrical actuating signal is carried to the various drivers 14 of each of the sections 12 of the transducers 11. The overall diaphragm of the transducer 11 is comprised of the series of section diaphragms 13 and by way of the extensional vibratory movement of each of the section drivers 14, which all operate in phase with each other, the overall transducer diaphragm is driven in flexural vibratile movement by the actuating signal brought to the transducer 11 by the external electrical lead 48.

As a general rule, the inner cavity of a transducer to be employed in a liquid medium is either filled with air or with a liquid such as oil or with an appropriate pressure release material such as corprene, for example. When it is air filled, the air therein may be "pressure equalized" with the increased external liquid medium pressure the transducer meets as it descends to greater depth in the liquid medium. Failure to use "pressure equalization" in such an "air-filled" transducer called upon to shift its position to various liquid medium depths causes the transducer to significantly sacrifice power output because of the added static stresses that might lead to fracture. The external equipment required to effect the necessary air pressure compensation to such a "pressure-equalized" air-filled transducer is burdensome and expensive.

As an alternative to the use of an "air fill" and external air-pressure-compensating equipment, there may be employed, for this pressure equalization of the transducer cavity, a "liquid fill" which is designed to behave like a pressure-release volume. This occurs when one or more of the dimensions (of the liquid-filled) transducer cavity are on or approach resonance or else the mechanical impedance of the internal liquid which is presented to the diaphragm is considerably lower than that due to the combination of diaphragm and the external liquid medium. Along with the use of a "liquid fill" some suitable means must be provided for equalizing the static pressure to be encountered in the outside fluid medium. For many transducers this is performed by the use of a rubber diaphragm (sometimes referred to as a "rubber boot"). Here it is accomplished by the use of a rubber bag which is located on the outside of the transducer and which is in fluid communication with transducer cavity to serve as a variable-capacity fluid reservoir for overflow of liquid from the transducer "liquid-fill" thus serving to absorb shifts in volume of the liquid within the transducer cavity due to shift in hydrostatic pressure of the outside fluid medium. (This structure just named will be described in detail infra.) Ordinarily, most of all the currently-available liquids have an intrinsic sound speed and acoustic impedance that lies within a factor of two of that in water and consequently they are poor "pressure-release" materials to be used as "liquid-fill" in the cavity of a transducer to be employed, say, in the ocean, unless the inner dimensions of the transducer cavity are large enough for a near resonant condition to exist. The most promising liquids for such a "liquid fill" in the transducer cavity are silicon fluids and fluorine compounds with speeds of sound that range from two-thirds to one-third that for water. Very frequently, however, even with such fluids, the internal cavity available in the transducer is insufficiently large for use of such fluids. To meet this situation and to generally provide an improved "cavity fill" for this purpose of "hydrostatic pressure equalization" the present transducer 11 employs a transducer "cavity fill" consisting of a combination of "compliant tubes" and "liquid fill." In addition to the transducer cavity, as previously mentioned supra, for meeting varying static pressures in the outside fluid medium (e.g., ocean) transducer 11 is provided with an externally mounted flexible rubber bag 60 which is in fluid communication with the internal cavity 56 of the transducer 11. Here flexible bag 60 is shown with its neck-end disposed around the tube 61 and securely fastened to the tube 61 by the encircling clamp 62. Tube 61 is firmly held by interference and watertight fit in a mating hole 63 provided therefor in the closure plate 38. It would be appropriate to mount tube 61 in either one of the closure plates 38 or 39. Liquid will readily pass back and forth through tube 61 which interconnects the transducer cavity 56 with the flexible bag 60 to establish the necessary fluid communication between cavity 56 and the interior of flexible bag 60. This tube 61 is quite small in diameter, but is sufficient to permit the transducer to pressure equalize the changes in static pressures encountered in the outside fluid medium by having the flexible bag 60 act as an overflow reservoir to accommodate overflow liquid from the liquid fill of the transducer cavity as varied by shifts in the hydrostatic pressure encountered by the transducer 11 in the external fluid medium. Any conventional way of mounting flexible bag 60 external to the transducer 11 and in fluid communication with the transducer cavity 56 will be appropriate. The "compliant tubes" 54 as employed here as a "pressure-release" material are thin-walled compressible tubes which in order to increase their compressibility have been deformed or partially flattened so that the resulting cross section of the tubes varies from the circular cross-section which these tubes have when originally procured from commercial sources; the resulting cross section configurations are usually elliptical or figure-eights since these are the easiest to form and are completely satisfactory in their resulting "compliance." Compliant tubes 54 as shown here in the drawing are of elliptical cross-section. The purpose of the tube's deformation is to give each tube a substantial degree of compliance or compressibility. Each of these compliant tubes 54 is sealed off at its respective longitudinal ends, thus sealing off its internal portion from the surrounding fluid. Each sealed compliant tube 54 will generally be filled with any fluid which has a greater compressibility than that of the fluid directly outside the tube and generally will be filled with air because of the relative ease involved. These complaint tubes 54 are distinguished by a compressibility of constant value which essentially is independent of outside static pressures as long as the mechanical stresses in the tube walls remain below the yield strength. Exemplary of suitable "compliant tube" material is a thin-walled metallic tube 6061–T6, ⅜ of an inch outside diameter and of 0.28 inch wall thickness which is partially flattened to form a "compliant tube." The ends of the tube may be sealed by soldering or welding or the like.

Figure 4:
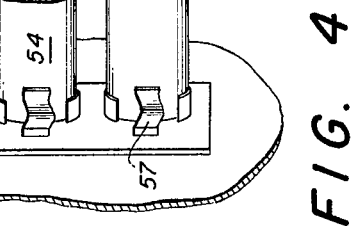
FIG. 4 shows several "compliant tubes" fastened to one of the transducer "closure plates"

Looking now specifically to the drawing, the cavity 56 of transducer 11 (i.e. that portion within the closed off series of sections 12 which is not filled by the drivers 14 and their associated structure) is filled with an appropriate liquid 59 (such as the silicon and fluorine liquids previously noted) and a plurality of "compliant tubes" 54 filled with a suitable "pressure-release" material such as air, celltite rubber, corprene, to name a few. The use of liquids inside the "compliant tubes" 54 as a "pressure-release" material is generally undesirable because they are relatively incompressible compared with those "pressure release" materials just named. There is nothing critical about the orientation of these pressure-release-material-filled compliant tubes 54 within the cavity 56. They merely need to be anchored down within the otherwise liquid-filled cavity 56. Here the compliant tubes 54 with, their pressure-release material fill, run longitudinally throughout the length of the transducer cavity 56 and are held in fixed position by opposing clips 57 (FIG. 4) which are fixedly mounted to the inside faces of the respective closure plates 38 and 39. In most instances the pressure-release material 58 inside the compliant tube 54 will be air. The given number of compliant tubes 54 employed within the transducer 11 will depend on the size of the cavity 56, the liquid used for liquid-fill and the ultimate operational hydrostatic pressure to be encountered in the outside fluid medium. The general criterion to be followed, when fixing the number of compliant tubes 54, is to adjust the number of compliant tubes so that the inside volume resonance (of the transducer) is comparable to the resonant frequency of the transducer when its cavity 56 is filled with air. Looking at it another way, changing the number of compliant tubes within the cavity of the transducer 11 is a way also of changing the "tuning" of the transducer 11. The general objective of the transducer cavity "fill" consisting of the combination of "compliant tubes" (containing an appropriate "pressure-release" material such as air, for example) and a suitable cavity liquid suitably vented to equalize the static pressure (see FIG. 1) is to enable the transducer to meet the necessary static pressures of the medium in which it is immersed and yet at the same time have the cavity fill give a minimum amount of interference to the coupling of the transducer energy into the medium, so as to maintain desirable electroacoustic characteristics and the greatest possible radiation output. The combination liquid-and-compliant tube cavity "fill" enables the transducer 11, in contra-distinction to other liquid-filled transducers, to meet the hydrostatic pressures exerted by the outside liquid medium (e.g., the ocean) with a minimal amount of interference with the important function of the transducer of yielding a maximum radiation output, frequency response, and efficiency. Use of "compliant tubes" with an appropriate liquid for the cavity "fill" of the transducer can enable reduction of the speed of sound in such liquids by a factor as much as 2–10. With the "compliant tube"-plus-liquid "fill" the operational depth of the transducer 11 at sea is limited only by the yield strength characteristics of the compliant-tube materials. By using special steels therein, depths of 1 to 2 miles are possible.

An incidental advantage of the "compliant-tube"-plus-liquid "fill" in the transducer 11 is that the liquid, which will have electrically-insulating characteristic, greatly reduces the high voltage break-down risk encountered with use of piezoceramic drivers. Thus piezoceramic-driven transducers with either a liquid or liquid-plus-"compliant-tube" cavity "fill" can be driven at much higher power outputs than can such transducers with an air cavity-fill. The liquid in such a liquid-present fill also permits better coling of the ceramic material (of the driver(s)) when a high duty cycle needs to be maintained at high power output.

In addition to the characteristics just described which are attributable to its "liquid-plus-compliant-tube" fill for the transducer cavity 56, transducer 11 is further characterized by high electro-mechanical efficiency and high power output along with a broadband transmission capacity and for maximum power output and efficiency, the preferred operation is at mechanical resonance. In its usual dimensions it is very nearly omnidirectional in radiation pattern in space. The general rule for determining whether a transducer is (selectively) directive, or not, in its radiation pattern is that when the dimensions of the radiating surface of the transducer are small compared to the wave length of sound in the outside sound-propagating medium, such a transducer does not have "directivity," that is its radiation pattern is "omnidirectional" in character. Directivity may be obtained with such transducers, when desired, by arranging multiple such transducers in arrays or employing them in conjunction with focusing lenses or reflectors. The mating of the extensional and flexural modes of vibration, as achieved in this transducer, produces a more effective transducer which obtains the same propagation results with a much smaller transducer than has been used previously. The simplicity of the transducer 11 where the "diaphragm" also serves as the liquid-precluding "envelope," without the need for the use of such additional structure as the conventional "rubber boot" which often serves as the necessary transducer "container," is patent. As noted above, the character of the transducer diaphragm can be varied readily to give either increased power output and electromechanical conversion efficiency or greater frequency bandwidth, as desired. With its prestressed ceramic drivers, and particularly as supplemented by its "liquid-plus-'compliant-tube'" cavity fill, it is able to achieve significantly high power output.

In addition to the use of a cavity-fill consisting of a "liquid" supplemented by "compliant tubes," where great ocean depths are to be encountered, this invention contemplates the use of a cavity fill consisting of a liquid supplemented by a plurality of thin-wall spherical shells such as "hollow glass balls" which serve as an appropriate pressure-release material for the high pressures to be encountered at great ocean depths. FIG. 6 portrays an embodiment of the invention wherein the cavity fill comprises liquid 59 in which are deposited a plurality of hollow glass spheres 64. These hollow glass balls will be filled with air or any other appropriate material characterized by a compressibility which is substantially greater than the compressibility of the liquid 59 in which they are immersed.

Obviously many variations and modifications of the present invention are possible in the light of the above teachings. It is intended to cover all changes and modifications of the embodiments set forth herein which do not constitute departure from the spirit and scope of this invention.

What is claimed is:

1. A composite electromecanical transducer comprising in combination:
   a plurality of open-ended tubular diaphragm members of identical non-circular cross sections, each of said tubular diaphragm members being adapted to vibrate in the flexural mode and said plurality of tubular diaphragm members being joined and sealed end-to-end,
   electrically-actuable electromechanical converter means, individual to an disposed within each of said diaphragm members in thrust-transmitting relationship therewith and vibratile in the longitudinal mode of vibration in response to actuating electrical signals,
   closure means sealed across both ends of the tubular diaphragm means,
   electrical conductors connected to each of said electromechanical converter means for actuating the respective electromechanical converter means,
   means for uniting said diaphragms and closure means so that said diaphragms and said closure means constitutes a transducer cavity,
   means for automatically equalizing the pressure within said transducer cavity with external hydrostatic pressure,
   each converter means comprising a stack of electromechanical-active elements each of which is adapted to alternately expand and contract along the longitudinal axis of said stack in response to the application of said electromechanically-active elements of an electric signal of fluctuating intensity, the longitudinal ends of said stack being in thrust-transmitting relationship with its associated diaphragm member;
   electrode means, operatively interconnecting each of said electromechanically-active elements to said electrical conductors for bringing each of said electromechanically-active elements under the operative influence of the actuating fluctuating electrical signal carried by said electrically-conductive actuating means;
   insulator means, intermediate the respective longitudinal ends of said stack of electromechanically-active elements and the diaphragm member associated therewith, for electrically insulating said stack of electromechanically-active elements from said associated diaphragm member; and
   heat dissipating means, connected to each of the electromechanically-active elements in said stack for conducting heat away from said electromechanically-active elements, said heat-dissipating means, in part, consisting of wire mesh-like structure for accelerating the dissipation of heat away from said electromechanically-active elements.

2. The transducer of claim 1 wherein said electromechanical converter means further comprises mesh-like heat dissipating means connected to each of said ceramic plates for conducting heat away from said ceramic plates.

3. A cavity-fill for filling the otherwise-unoccupied cavity of a transducer which is adapted to be immersed in a liquid medium for the purpose of either transmitting or detecting sound therein and which is adapted to be operated at a variety of depth positions within said liquid medium, comprising:

a relatively compressible liquid; and
a plurality of compliant members immersed in said liquid, each of said compliant members comprising:
  (a) a hollow glass sphere; and
  (b) matter filling said hollow glass sphere, said matter having a substantially greater compressibility than does said liquid in which said complaint members are immersed.

4. The cavity of claim 3 wherein said matter within each of said hollow glass spheres is air.

5. A composite electromechanical transducer, adapted to transmit or detect sound in a liquid medium and herein defined in terms of its sound transmission operation, comprising in combination:

a plurality of end-to-end tubular non circular diaphragm members,
a stack of electromechanically-active elements each of which is adapted to alternately expand and contract along the longitudinal axis of said stack in response to the application to said electromechanically-active elements of an electric signal of fluctuating intensity, the longitudinal ends of said stack being in thrust-transmitting relationship with its associated diaphragm member,
electrode means, operatively interconecting each of said electromchanically-active elements to electrically-conductive actuating means for bringing each of said electromechanically-active elements under the operative influence of the actuating fluctuating electrical signal carried by said electrically-conductive actuating means,
insulator means intermediate the respective longitudinal ends of said stack of electromechanically-active elements and the diaphragm member associated therewith, for electrically insulating said stack of electromechanically-active elements from said associated diaphragm member,
pressure-release means comprising a relatively compressible liquid in the cavity defined by said diaphragms,
a plurality of compliant members immersed in said liquid, each of said compliant members comprising a hollow glass sphere, and
matter filling said hollow glass sphere, said matter having a substantially greater compressibility than does said liquid in which said compliant members are immersed.

6. The transducer of claim 5 wherein said matter within each of said tubes is air.

7. The transducer of claim 5 wherein said matter within each of said hollow glass spheres is air.

References Cited by the Examiner

UNITED STATES PATENTS

| | | | |
|---|---|---|---|
| 2,064,911 | 12/1936 | Hayes | 340—9 X |
| 2,883,486 | 4/1959 | Mason | 340—8.6 |
| 2,967,956 | 1/1961 | Dranetz. | |
| 2,978,672 | 4/1961 | Barney | 340—8 X |
| 3,127,527 | 12/1961 | Elston | 340—8.6 |

CHESTER L. JUSTUS, *Primary Examiner.*

G. M. FISHER, *Assistant Examiner.*